(12) United States Patent
Zeng et al.

(10) Patent No.: US 11,286,207 B2
(45) Date of Patent: Mar. 29, 2022

(54) METHOD FOR PREPARING CARBON-REINFORCED METAL-CERAMIC COMPOSITE MATERIAL

(71) Applicants: Chongqing Institute of East China Normal University, Chongqing (CN); East China Normal University, Shanghai (CN)

(72) Inventors: Heping Zeng, Chongqing (CN); Yanwei Huang, Chongqing (CN); Jiayang He, Chongqing (CN)

(73) Assignees: CHONGQING INSTITUTE OF EAST CHINA NORMAL UNIVERSITY, Chongqing (CN); EAST CHINA NORMAL UNIVERSITY, Shanghai (CN)

(*) Notice: Subject to any disclaimer, the term of this patent is extended or adjusted under 35 U.S.C. 154(b) by 0 days.

(21) Appl. No.: 16/899,159

(22) Filed: Jun. 11, 2020

(65) Prior Publication Data
US 2021/0032165 A1 Feb. 4, 2021

(30) Foreign Application Priority Data
Jul. 30, 2019 (CN) .......................... 201910696786.8

(51) Int. Cl.
*C04B 35/46* (2006.01)
*C04B 35/78* (2006.01)

(52) U.S. Cl.
CPC .............. *C04B 35/46* (2013.01); *C04B 35/78* (2013.01); *C04B 2235/3208* (2013.01); *C04B 2235/3281* (2013.01); *C04B 2235/404* (2013.01); *C04B 2235/407* (2013.01); *C04B 2235/422* (2013.01)

(58) Field of Classification Search
CPC . C04B 35/46; C04B 35/78; C04B 2235/3208; C04B 2235/3281; C04B 2235/404; C04B 2235/407; C04B 2235/422; C03B 2215/34; C22C 29/12; C22C 1/0425; C22C 1/05; C22C 2204/00; C22C 28/027
See application file for complete search history.

(56) References Cited

U.S. PATENT DOCUMENTS

2006/0172073 A1* 8/2006 Groza .................. C04B 35/119
427/421.1

* cited by examiner

*Primary Examiner* — Karl E Group
*Assistant Examiner* — Cameron K Miller
(74) *Attorney, Agent, or Firm* — Hodgson Russ LLP

(57) ABSTRACT

Disclosed is a method for preparing a carbon-reinforced metal-ceramic composite material, including: mixing raw materials of carbon, copper, zinc, titanium, copper oxide, calcium oxide and titanium dioxide, ball-milling the raw materials with a medium of ethanol to obtain a mixture, drying and milling the mixture to obtain a powder, sintering the powder with a laser having an irradiation power ranging from 100 to 600 W and an irradiation period of 3 min to 10 min to obtain a product, and rapidly cooling the product to allow a temperature of the product to be decreased to the room temperature within 5 min to obtain the carbon-reinforced metal-ceramic composite material.

8 Claims, 1 Drawing Sheet

METHOD FOR PREPARING CARBON-REINFORCED METAL-CERAMIC COMPOSITE MATERIAL

CROSS-REFERENCE TO RELATED APPLICATION

This application claims priority to and benefits of Chinese Patent Application Serial No. 201910696786.8, filed with the National Intellectual Property Office Administration of P. R. China on Jul. 30, 2019, the entire contents of which is incorporated herein by reference.

TECHNICAL FIELD

The present disclosure relates to a field of material processing, and particular to a method for preparing a carbon-reinforced metal-ceramic composite material and a carbon-reinforced metal-ceramic composite material prepared by the method.

BACKGROUND

In the field of composite material processing, a composite material is normally prepared by existing painting methods such as brushing, scraping, dipping, spraying methods, and different preparation methods may result in different properties of the composite material. For example, raw material powders may be mixed with a binder and a dispersant to obtain a mixture, and the mixture is used for coating. Such a method is usually used for small area operation. For a large-area operation, the method consumes a lot of labor costs and has a low efficiency. Cracking, shedding and rolling may easily happen to the obtained coating. In another example, a thermal spraying technology may improve the operation efficiency. However, a thickness of the obtained coating layer by the thermal spraying technology is not uniform, leading to cracking at the junction of the coating and the substrate. Moreover, the thermal spraying technology has a large raw material consumption and gaseous emission, which is not suitable for ceramic-based functional coatings. Therefore, there is still a need for providing a method for preparing a carbon-reinforced metal-ceramic composite material.

SUMMARY

The present disclosure seeks to solve at least one of the problems that exist in the related art to at least some extent.

Accordingly, in an aspect, the present disclosure provides in embodiments a method for preparing a carbon-reinforced metal-ceramic composite material, including: mixing raw materials of carbon of 5 wt % to 8 wt %, copper of 10 wt % to 15 wt %, zinc of 10 wt % to 18 wt %, titanium of 20 wt % to 33 wt %, copper oxide of 5 wt % to 8 wt %, calcium oxide of 18 wt % and 35 wt % and titanium dioxide of a balance amount to 100 wt %, based on the total amount of the raw materials, ball-milling the raw materials with a medium of ethanol to obtain a mixture, drying and milling the mixture to obtain a powder, sintering the powder with a laser having an irradiation power ranging from 100 to 600 W and an irradiation period of 3 min to 10 min to obtain a product, and rapidly cooling the product to allow a temperature of the product to be decreased to the room temperature within 5 min to obtain the carbon-reinforced metal-ceramic composite material.

In another aspect, the present disclosure provides in embodiments a carbon-reinforced metal-ceramic composite material, prepared by the method as described above.

In a yet another aspect, the present disclosure provides in embodiments a use of a carbon-reinforced metal-ceramic composite material as described above in a protective coating.

BRIEF DESCRIPTION OF THE DRAWINGS

These and/or other aspects and advantages of embodiments of the present disclosure will become apparent and more readily appreciated from the following descriptions made with reference to the drawings, in which.

DETAILED DESCRIPTION

Figure 1:
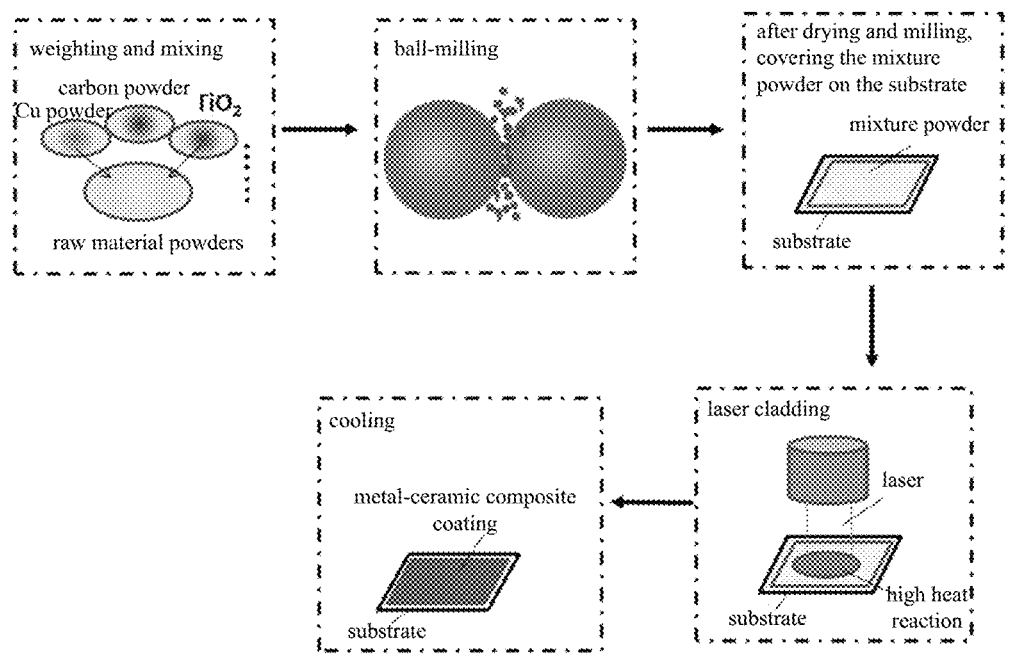
FIG. 1 is a schematic diagram showing preparation operations of a metal-ceramic composite material coating according to an embodiment of the present disclosure.

Embodiments of the present disclosure are described in detail below, examples of which are illustrated in the drawings. The embodiments described herein with reference to drawings are explanatory, and used to generally understand the present disclosure. The embodiments shall not be construed to limit the present disclosure.

The present disclosure provides in embodiments a method for preparing a ceramic material and a ceramic material prepared by the method.

In an aspect, the present disclosure provides in embodiments a method for preparing a carbon-reinforced metal-ceramic composite material, including: mixing raw materials of carbon of 5 wt % to 8 wt %, copper of 10 wt % to 15 wt %, zinc of 10 wt % to 18 wt %, titanium of 20 wt % to 33 wt %, copper oxide of 5 wt % to 8 wt %, calcium oxide of 18 wt % and 35 wt % and titanium dioxide of a balance amount to 100 wt %, based on the total amount of the raw materials, ball-milling the raw materials with a medium of ethanol to obtain a mixture, drying and milling the mixture to obtain a powder, sintering the powder with a laser having an irradiation power ranging from 100 to 600 W and an irradiation period of 3 min to 10 min to obtain a product, and rapidly cooling the product to allow a temperature of the product to be decreased to the room temperature within 5 min to obtain the carbon-reinforced metal-ceramic composite material.

In an embodiment, the ball-milling is performed at a ball-milling speed of 400 rpm for a period ranging from 8 to 24 h.

In an embodiment, the drying is performed at a temperature in a range of 60 to 80° C.

In an embodiment, the milling includes at least one of manual grinding and ball-milling.

In an embodiment, carbon is provided by a carbon source selected from at least one of sucrose, glucose, a carbon-containing organic solvent, a graphite powder, a carbon nanomaterial, and graphene.

In an embodiment, the laser is a semiconductor laser having a laser wavelength of 980 nm.

In an embodiment, the laser is a $CO_2$ laser having a laser wavelength of 1060 nm.

In an embodiment, rapidly cooling the product includes spraying liquid nitrogen or liquid ammonia onto the product.

In another aspect, the present disclosure provides in embodiments a carbon-reinforced metal-ceramic composite material, prepared by the method as described above.

It should be understood that the detail features and advantages in the above embodiments of the method for preparing a ceramic material are also applicable to the embodiments of the ceramic material, and will not be described here again.

In some embodiments of the present disclosure, the carbon-reinforced metal-ceramic composite material prepared is used as a protective coating. For the coating of the carbon-reinforced metal-ceramic composite material, a metal component refers to alloy phases such as CuTi, Zn—Cu—Ti—Ca alloy and TiC served as a bonding phase in the coating, and a ceramic component refers to composite materials such as CuO, $TiO_2$, $CaTiO_3$ and $Zn_2TiO_4$ served as a hard phase in the coating. The two phases work together to make the coating not only have the toughness of metal materials, but also have the corrosion resistance and wear resistance properties of ceramic materials.

The composite coating system of the present disclosure refers to C—CuTi/Zn—Cu—Ti—Ca/TiC/CuO—$TiO_2$—$CaTiO_3$—$Zn_2TiO_4$. During the laser cladding process, due to the rapid thermal shock of the laser, some metal oxides, such as CuO and $TiO_2$, have been reduced. Original copper ion positions are occupied by $Ti^{4+}$ ions and $Cu^+$ may be re-oxidized into $Cu^{2+}$ at a high heat environment. $Ti^{4+}$ may be reduced to a low-valent ion, such as $Ti^{3+}$. The precipitated metal components may be alloyed at the high heat environment to form the metal phase of the coating.

With the method for preparing a carbon-reinforced metal-ceramic composite material of the present disclosure, a new carbon-reinforced metal-ceramic composite material is prepared and may be applied on a substrate as a coating. The laser used may provide a rapid impact on the raw materials to reduce the oxides into metals and further generate alloys which form the composite coating together with the ceramic components provided by the raw materials. The composite coating is metallurgically combined with the substrate, and exhibits improved hardness, corrosion resistance and wear resistance. The method of the present disclosure is easy to operate, has a high raw material utilization rate, is free of pollution, and thus is suitable for preparing the carbon-reinforced metal-ceramic composite material which may be used as an anti-corrosion and wear-resistant coating.

EXAMPLE 1

In this example, a semiconductor laser having a wavelength of 980 nm and a power of 350 W was used to prepare a carbon-reinforced metal-ceramic composite coating on a surface of a copper substrate. Raw materials of graphite powder of 8 wt %, Cu powder of 10 wt %, Zn powder of 18 wt %, Ti powder of 25 wt %, CuO of 6 wt %, Cazo of 25 wt % and $TiO_2$ of a balance amount (i.e., 8 wt %) to 100 wt % based on the total amount of the raw materials were mixed and placed into a zirconia ball-milling tank for a high-energy wet ball-milling. Anhydrous ethanol was used as a medium of the ball-milling and the ball-milling was performed at a ball-milling speed of 400 rpm for 24 hours to obtain a mixture. The mixture was dried in an oven at 75° C. and further milled. A copper substrate was polished and arranged on a laser cladding device. The mixture was uniformly covered on the copper substrate. The mixture was sintered with the laser having the laser sintering power of 500 W for 5 min and then rapidly cooled by spraying liquid nitrogen to make a temperature of a generated product to be decreased to the room temperature within 5 min to obtain the carbon-reinforced metal-ceramic composite material of C—CuTi/Zn—Cu—Ti—Ca/TiC/CuO—$TiO_2$—$CaTiO_3$—$Zn_2TiO_4$.

FIG. 1 is a schematic diagram showing preparation operations of the metal-ceramic composite material coating. The corrosion resistance of such a metal-ceramic composite material coating in 5% $H_2SO_4$ and 20% NaCl solution is 10 times higher than that of a traditional T10 steel.

EXAMPLE 2

In this example, a semiconductor laser having a wavelength of 980 nm and a power of 500 W was used to prepare a carbon-reinforced metal-ceramic composite coating on a surface of a copper substrate. Raw materials of sucrose of 8 wt %, Cu powder of 12 wt %, Zn powder of 18 wt %, Ti powder of 25 wt %, CuO of 8 wt %, CaO of 25 wt % and $TiO_2$ of a balance amount (i.e., 4 wt %) to 100 wt % based on the total amount of the raw materials were mixed and placed into a zirconia ball-milling tank for a high-energy wet ball-milling. Anhydrous ethanol was used as a medium of the ball-milling and the ball-milling was performed at a ball-milling speed of 400 rpm for 12 hours to obtain a mixture. The mixture was dried in an oven at 70° C. and further milled. A copper substrate was polished and arranged on a laser cladding device. The mixture was uniformly covered on the copper substrate. The mixture was sintered with the laser having the laser sintering power of 500 W for 8 min and then rapidly cooled by spraying liquid nitrogen to make a temperature of a generated product to be decreased to the room temperature within 5 min to obtain the carbon-reinforced metal-ceramic composite material of C—CuTi/Zn—Cu—Ti—Ca/TiC/CuO—$TiO_2$—$CaTiO_3$—$Zn_2TiO_4$.

The corrosion resistance of such a metal-ceramic composite material coating in 10% $H_2SO_4$ solution is 10 times higher than that of a traditional T10 steel.

EXAMPLE 3

In this example, a $CO_2$ laser having a wavelength of 1060 nm and a power of 105 W was used to prepare a carbon-reinforced metal-ceramic composite coating on a surface of a copper substrate. Raw materials of graphite powder of 5 wt %, Cu powder of 12 wt %, Zn powder of 18 wt %, Ti powder of 25 wt %, CuO of 6 wt %, CaO of 25 wt % and $TiO_2$ of a balance amount (i.e., 9 wt %) to 100 wt % based on the total amount of the raw materials were mixed and placed into a zirconia ball-milling tank for a high-energy wet ball-milling. Anhydrous ethanol was used as a medium of the ball-milling and the ball-milling was performed at a ball-milling speed of 400 rpm for 24 hours to obtain a mixture. The mixture was dried in an oven at 75° C. and further milled. A copper substrate was polished and arranged on a laser cladding device. The mixture was uniformly covered on the copper substrate. The mixture was sintered with the laser having the laser sintering power of 105 W for 5 min and then rapidly cooled by spraying liquid nitrogen to make a temperature of a generated product to be decreased to the room temperature within 5 min to obtain the carbon-reinforced metal-ceramic composite material of C—CuTi/Zn—Cu—Ti—Ca/TiC/CuO—$TiO_2$—$CaTiO_3$—$Zn_2TiO_4$.

Figure 2:
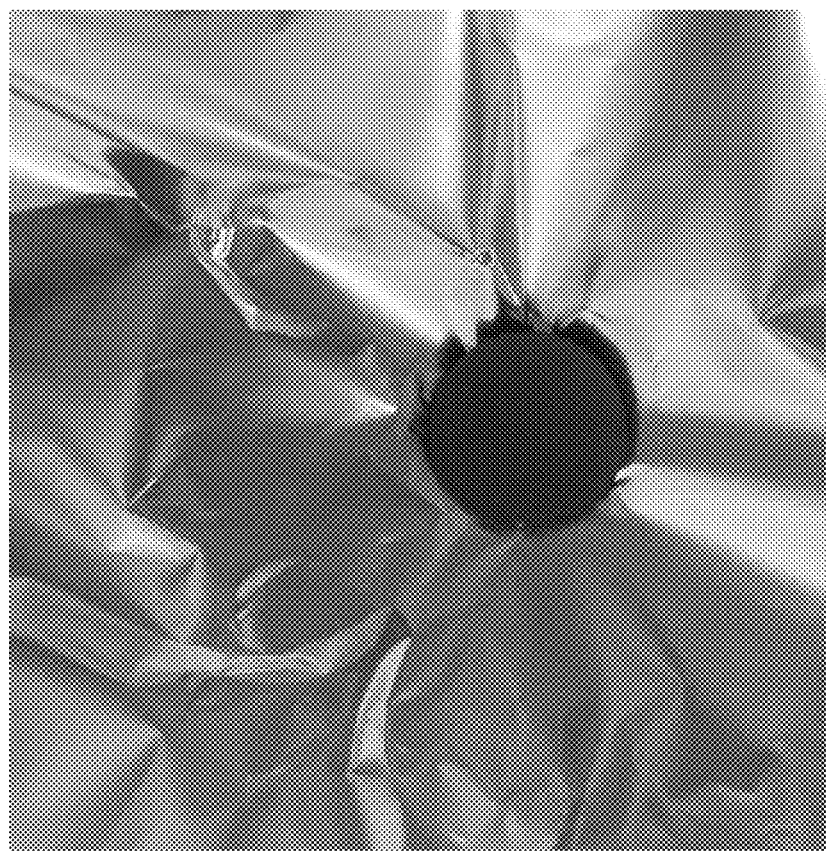
FIG. 2 is a photograph of a metal-ceramic composite material coating according to an embodiment of the present disclosure.

FIG. 2 is a photograph of the metal-ceramic composite material coating on the copper substrate. The corrosion resistance of such a metal-ceramic composite material coating in 5% $H_2SO_4$ and 20% NaOH solution is 10 times higher than that of a traditional T10 steel.

EXAMPLE 4

In this example, a $CO_2$ laser having a wavelength of 1060 nm and a power of 300 W was used to prepare a carbon-reinforced metal-ceramic composite coating on a surface of a copper substrate. Raw materials of graphite powder of 5 wt %, Cu powder of 10 wt %, Zn powder of 18 wt %, Ti powder of 25 wt %, CuO of 6 wt %, CaO of 25 wt % and $TiO_2$ of a balance amount (i.e., 11 wt %) to 100 wt % based on the total amount of the raw materials were mixed and placed into a zirconia ball-milling tank for a high-energy wet ball-milling. Anhydrous ethanol was used as a medium of the ball-milling and the ball-milling was performed at a ball-milling speed of 400 rpm for 24 hours to obtain a mixture. The mixture was dried in an oven at 75° C. and further milled. A copper substrate was polished and arranged on a laser cladding device. The mixture was uniformly covered on the copper substrate. The mixture was sintered with the laser having the laser sintering power of 300 W for 5 min and then rapidly cooled by spraying liquid nitrogen to make a temperature of a generated product to be decreased to the room temperature within 5 min to obtain the carbon-reinforced metal-ceramic composite material of C—CuTi/Zn—Cu—Ti—Ca/TiC/CuO—$TiO_2$—$CaTiO_3$—$Zn_2TiO_4$.

The corrosion resistance of such a metal-ceramic composite material coating in 10% $H_2SO_4$ and 20% NaCl solution is 10 times higher than that of a traditional T10 steel.

EXAMPLE 5

In this example, a semiconductor laser having a wavelength of 980 nm and a power of 200 W was used to prepare a carbon-reinforced metal-ceramic composite coating on a surface of a copper substrate. Raw materials of glucose of 5 wt %, Cu powder of 10 wt %, Zn powder of 18 wt %, Ti powder of 25 wt %, CuO of 6 wt %, CaO of 25 wt % and $TiO_2$ of a balance amount (i.e., 11 wt %) to 100 wt % based on the total amount of the raw materials were mixed and placed into a zirconia ball-milling tank for a high-energy wet ball-milling. Anhydrous ethanol was used as a medium of the ball-milling and the ball-milling was performed at a ball-milling speed of 400 rpm for 12 hours to obtain a mixture. The mixture was dried in an oven at 75° C. and further milled. A copper substrate was polished and arranged on a laser cladding device. The mixture was uniformly covered on the copper substrate. The mixture was sintered with the laser having the laser sintering power of 200 W for 5 min and then rapidly cooled by spraying liquid nitrogen to make a temperature of a generated product to be decreased to the room temperature within 5 min to obtain the carbon-reinforced metal-ceramic composite material of C—CuTi/Zn—Cu—Ti—Ca/TiC/CuO—$TiO_2$—$CaTiO_3$—$Zn_2TiO_4$.

The corrosion resistance of such a metal-ceramic composite material coating in 5% $H_2SO_4$ and 10% NaOH solution solution is 10 times higher than that of a traditional T10 steel.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification, as well as features of embodiments or examples, without conflicting, may be combined by one skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for preparing a carbon-reinforced metal-ceramic composite material, comprising:
    mixing raw materials of carbon at 5 wt % to 8 wt %, copper at 10 wt % to 15 wt %, zinc at 10 wt % to 18 wt %, titanium at 20 wt % to 33 wt %, copper oxide at 5 wt % to 8 wt %, calcium oxide at 18 wt % and 35 wt % and titanium dioxide at a balance amount to 100 wt %, based on a total amount of the raw materials,
    ball-milling the raw materials with a medium of ethanol to obtain a mixture,
    drying and milling the mixture to obtain a powder,
    sintering the powder with a laser having an irradiation power ranging from 100 to 600 W and an irradiation period of 3 min to 10 min to obtain a product, and
    rapidly cooling the product to allow a temperature of the product to be decreased to room temperature within 5 min to obtain the carbon-reinforced metal-ceramic composite material.

2. The method according to claim 1, wherein the ball-milling is performed at a ball-milling speed of 400 rpm for a period ranging from 8 to 24 h.

3. The method according to claim 1, wherein the drying is performed at a temperature in a range of 60 to 80° C.

4. The method according to claim 1, wherein the milling includes at least one of manual grinding and ball-milling.

5. The method according to claim 1, wherein the carbon is provided by a carbon source selected from at least one of sucrose, glucose, a carbon-containing organic solvent, a graphite powder, a carbon nanomaterial, and graphene.

6. The method according to claim 1, wherein the laser is a semiconductor laser having a laser wavelength of 980 nm.

7. The method according to claim 1, wherein the laser is a $CO_2$ laser having a laser wavelength of 1060 nm.

8. The method according to claim 1, wherein rapidly cooling the product comprises:
    spraying liquid nitrogen or liquid ammonia onto the product.

* * * * *